US011360041B2

(12) United States Patent
Okihara

(10) Patent No.: US 11,360,041 B2
(45) Date of Patent: Jun. 14, 2022

(54) REFERENCE ELECTRODE

(71) Applicant: LAPIS Semiconductor Co., Ltd., Yokohama (JP)

(72) Inventor: Masao Okihara, Yokohama (JP)

(73) Assignee: LAPIS SEMICONDUCTOR CO., LTD., Yokohama (JP)

( * ) Notice: Subject to any disclaimer, the term of this patent is extended or adjusted under 35 U.S.C. 154(b) by 589 days.

(21) Appl. No.: 16/226,203

(22) Filed: Dec. 19, 2018

(65) Prior Publication Data

US 2019/0187088 A1 Jun. 20, 2019

(30) Foreign Application Priority Data

Dec. 20, 2017 (JP) .............................. JP2017-244439

(51) Int. Cl.
*G01N 27/30* (2006.01)
*G01N 27/414* (2006.01)
*G01N 27/401* (2006.01)
*G01N 27/416* (2006.01)

(52) U.S. Cl.
CPC ......... *G01N 27/301* (2013.01); *G01N 27/302* (2013.01); *G01N 27/401* (2013.01); *G01N 27/414* (2013.01); *G01N 27/4167* (2013.01)

(58) Field of Classification Search
CPC ............... G01N 27/301; G01N 27/414; G01N 27/401; G01N 27/302; G01N 27/4167
See application file for complete search history.

(56) References Cited

U.S. PATENT DOCUMENTS

| 3,790,463 A | * | 2/1974 | Gealt | G01N 27/301 204/435 |
| 2004/0195098 A1 | * | 10/2004 | Broadley | G01N 27/30 204/435 |
| 2006/0027453 A1 | * | 2/2006 | Catalano | G01N 27/401 204/435 |
| 2010/0086838 A1 | * | 4/2010 | Kirchev | H01M 4/54 429/94 |
| 2010/0108511 A1 | * | 5/2010 | Yang | G01N 27/301 204/408 |
| 2013/0213808 A1 | * | 8/2013 | Yang | G01N 27/301 204/435 |

FOREIGN PATENT DOCUMENTS

| JP | H06-30913 A | 2/1994 | |
| JP | 2006-177678 A | 7/2006 | |
| JP | 2014102125 A * | 6/2014 | |
| WO | WO-2009055092 A1 * | 4/2009 | ........... G01N 27/401 |

OTHER PUBLICATIONS

Osada (JP 2014102125 A, Machine Translation) (Year: 2014).*

* cited by examiner

*Primary Examiner* — Joshua L Allen
(74) *Attorney, Agent, or Firm* — Rabin & Berdo, P.C.

(57) ABSTRACT

A reference electrode is provided with an accommodation portion that is provided with a tube-shaped lead-out portion that can guide an accommodated internal liquid; a liquid junction portion that is connected to an end of the lead-out portion, and that allows the internal liquid to seep out; a liquid dripping portion that has a first end connected to the liquid junction portion, that has a second end that protrudes into the accommodation portion, and that guides the internal liquid to the liquid junction portion; and an internal electrode having at least a portion that is positioned further towards the first end side than the second end of the liquid dripping portion.

15 Claims, 11 Drawing Sheets

REFERENCE ELECTRODE

BACKGROUND OF THE INVENTION

The present invention relates to a reference electrode used for testing a given location.

One known method for measuring the pH of a given location, for example, is to use sensors, and one known type of sensor is one that measure pH with reference to the potential of a reference electrode.

The reference electrode is configured in a manner allowing a metal internal electrode to be soaked in an internal liquid and causing the internal liquid to permeate to an object for measurement through a liquid junction portion made of a porous material.

One known example of such a reference electrode is one in which the internal liquid and the liquid junction part are fixed to a sensor main body by a fitting structure (see, for example, Japanese Patent Application Laid-Open Publication No. H6-30913).

An accommodation portion that accommodates the internal liquid in the sensor main body is formed in the reference electrode, the internal electrode extends from one end of the accommodation portion, and the liquid junction portion is provided on the other end of the accommodation portion.

Another known reference electrode is one having the purpose of measuring the electrochemical indicator of high temperature/pressure boiler water or the like, and having a structure in which regular maintenance is required (see, for example, Japanese Patent Application Laid-Open Publication No. 2006-177678).

This reference electrode has an elongated accommodation space that accommodates the internal liquid, and the space between the internal electrode provided on one end of the accommodation space and the liquid junction portion on the other end is susceptible to bubbles forming therein. Thus, in order to maintain an electrical connection between the internal electrode and the internal liquid even when bubbles form in a portion of the space, the internal electrode and the liquid junction portion are connected by a braided body in which fibers are woven.

SUMMARY

However, in such reference electrodes, the internal electrode and the liquid junction portion are separated from each other. As a result, if the amount of internal liquid decreases while the reference electrode is being used in a state where the liquid junction portion is disposed towards the bottom, then regardless of the fact that the surface of the internal liquid is above the upper end of the liquid junction portion, conduction cannot be maintained between the internal electrode and the internal liquid. In such a case, there is a risk that the reference electrode cannot fulfill its function.

Also, in the latter reference electrode, the internal electrode and the liquid junction portion are connected by a braided body, but if there is a decrease in the internal liquid, then the internal liquid drawn upward by the braided body does not reach the internal electrode. In this case as well, there is a risk that the function of the reference electrode is diminished or cannot be fulfilled at all.

The present invention takes into account the above-mentioned problem, and an object thereof is to provide a reference electrode by which it is possible to mitigate a decrease in functionality resulting from a decrease in the amount of internal liquid.

A reference electrode according to the present invention includes: an accommodation portion that is provided with a tube-shaped lead-out portion that can guide an accommodated internal liquid; a liquid junction portion that is connected to an end of the lead-out portion, and that allows the internal liquid to seep out; a liquid dripping portion that has a first end connected to the liquid junction portion, that has a second end that protrudes into the accommodation portion, and that guides the internal liquid to the liquid junction portion; and an internal electrode having at least a portion that is positioned further towards the first end side than the second end of the liquid dripping portion.

According to the present invention, it is possible to provide a reference electrode by which it is possible to mitigate a decrease in functionality resulting from a decrease in the amount of internal liquid.

DETAILED DESCRIPTION OF EMBODIMENTS

Embodiment 1

Embodiment 1 of the present invention will be explained below with reference to the drawings.

Figure 1:
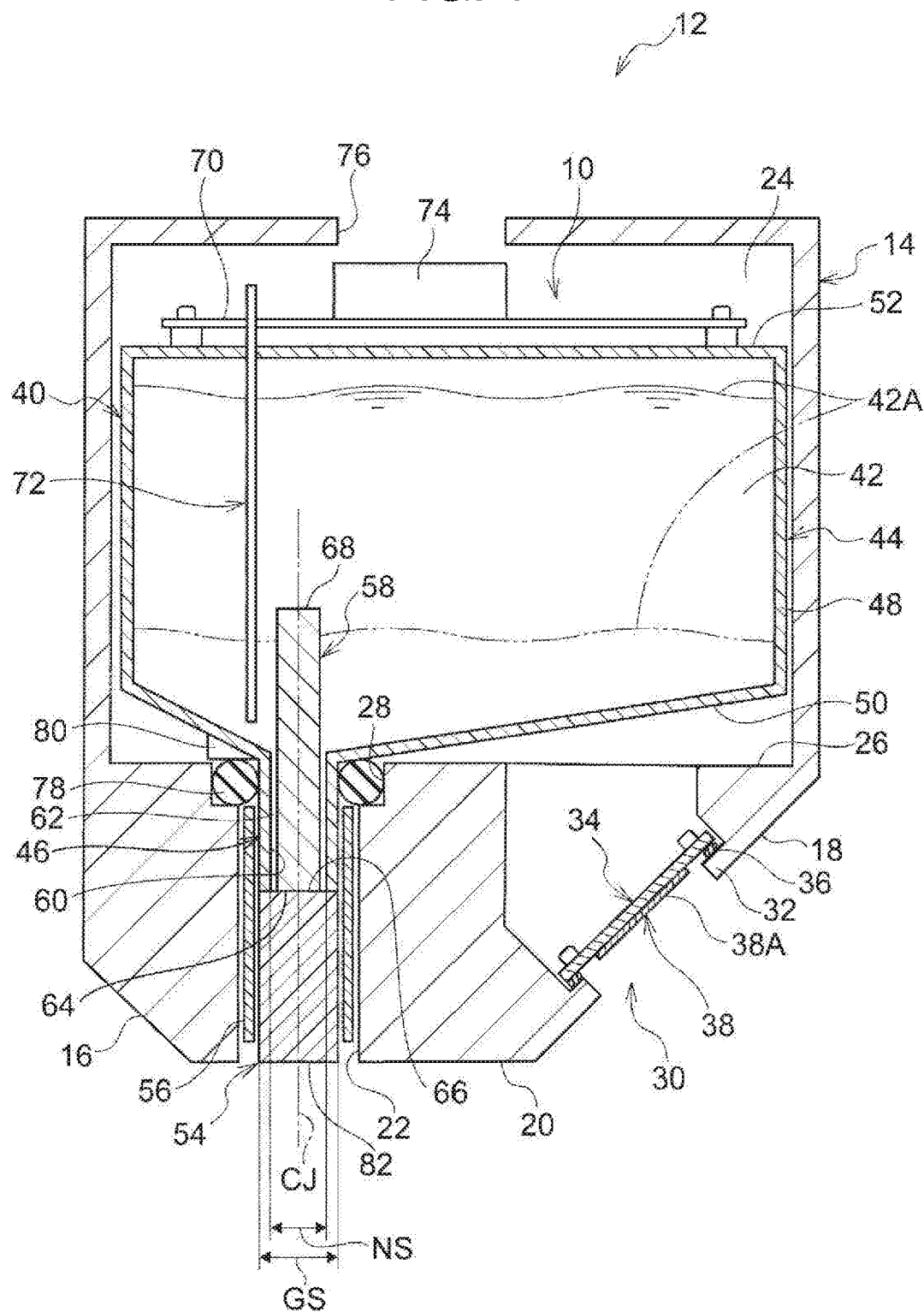
FIG. 1 is a cross-sectional view showing a sensor including a reference electrode according to Embodiment 1.

FIG. 1 is a cross-sectional view showing a sensor 12 including a reference electrode 10 according to the present embodiment. The sensor 12 is used in measuring the state of an object for measurement such as soil or a nutrient medium for hydroponic cultivation in which to grow a crop, and is configured to be able to measure the pH of the object for measurement.

A case 14 of the sensor 12 is, for example, made of a synthetic resin. The bottom end of the case 14 has formed therein a first inclined surface 16 and a second inclined surface 18 that, moving towards the bottom of FIG. 1, incline towards the center, and thus, the bottom end of the case 14 has a narrow tip.

A bottom surface 20 of the case 14 has formed therein a circular hole 22, and the hole 22 communicates with an accommodation space 24 formed in the case 14. A bottom surface 26 of the accommodation space 24 connected to the hole 22 has a counterbore 28 formed therein, and the counterbore 28 is formed so as to surround the hole 22.

The second inclined surface 18 formed in the case 14 has formed therein a substrate accommodation opening 30, and the edge of the substrate accommodation opening 30 has formed therein a flange 32 that extends inward. The substrate accommodation opening 30 has provided therein a sensor substrate 34, and the sensor substrate 34 is fixed in place so as to be in close contact with the flange 32 via a ring-shaped sealing member 36. As a result, a watertight seal is formed between the inside and the outside of the case 14.

The sensor substrate 34 is provided with an ISFET (ion sensitive field effect transistor) chip 38, which is a chip for measuring the pH of the object for measurement together with the reference electrode 10 to be described later.

The surface of the ISFET chip 38 has formed thereon an ion-sensitive film, which forms a sensitive surface 38A. In a state where the sensor 12 is disposed in the object for measurement, when a reference potential from the reference electrode 10 is applied to the object for measurement, hydrogen ions ($H^+$) in the object for measurement gather on the sensitive surface 38A of the ISFET chip 38. At this point, the ISFET chip 38 detects the interface potential between the object for measurement and the ion-sensitive film, and thus, by measuring the difference in potential between the interface potential detected by the ISFET chip 38 and the reference electrode, it is possible to measure the pH, which indicates the hydrogen-ion exponent of the object for measurement.

(Reference Electrode)

The reference electrode 10 is provided in the accommodation space 24 of the case 14. The reference electrode 10 applies a potential that serves as a reference for calculation of electrode potential and electrochemical measurement, and in the present embodiment, the reference electrode applies a reference potential to the object for measurement.

An accommodation portion 40 of the reference electrode 10 is made of glass or vinyl chloride, for example. The accommodation portion 40 has formed therein a tank portion 44 in the form of a container that accommodates an internal liquid 42, and a lead-out portion 46 that guides outward the internal liquid 42 inside the tank portion 44.

The tank portion 44 has a peripheral surface 48 that forms a cylindrical wall, a first end face 50 that closes off one end of the peripheral surface 48, and a second end face 52 that closes off another end of the peripheral surface 48. The cylindrical lead-out portion 46, which has a tube shape, extends from the first end face 50, and the lead-out portion 46 is connected to the inside of the tank portion 44.

The first end face 50 from which the lead-out portion 46 extends is inclined towards the one end from the outer peripheral portion towards the lead-out portion 46, and is configured such that with the first end face 50 facing downward, the internal liquid 42 gathers towards the lead-out portion 46.

The tip of the lead-out portion 46 is provided with a liquid junction portion 54. The liquid junction portion 54 is made of a porous material having pores, and allows the internal liquid 42 supplied from the lead-out portion 46 to seep through. Also, the liquid junction portion 54 is made of a porous glass, and is durable against the alkalinity or acidity of the object for measurement as well as the internal liquid 42.

In the present embodiment, an example will be described in which the liquid junction portion 54 is made of porous glass, but the configuration is not limited to this example. The liquid junction portion 54 can be made of a hydrophilic polypropylene, Vycor glass, or a porous ceramic, for example.

The liquid junction portion 54 is formed into a cylindrical shape with an outer diameter GS that is greater than an inner diameter NS of the lead-out portion 46, and the outer diameter GS of the liquid junction portion 54 is substantially the same as the outer diameter of the lead-out portion 46.

The outer peripheral surfaces of the liquid junction portion 54 and the lead-out portion 46 are provided with a thermal contraction tube 56. The thermal contraction tube 56 covering the liquid junction portion 54 and the lead-out portion 46 contracts when heated, thereby fixing the liquid junction portion 54 to the lead-out portion 46.

Examples are known of a thermal contraction tube 56 in which the internal surface thereof is provided with an adhesive. However, in the present embodiment, the thermal contraction tube 56 does not have an adhesive, thereby preventing seepage of an adhesive to the liquid junction portion 54.

The lead-out portion 46 has inserted therein one end of a liquid dripping portion 58. The liquid dripping portion 58 is constituted of a porous material having pores, and is impregnated with the internal liquid 42 in the tank portion 44. The liquid dripping portion 58 is made of a hydrophilic polypropylene, and is durable against the internal liquid 42.

In the present embodiment, an example will be described in which the liquid dripping portion 58 is made of polypropylene, but the configuration is not limited to this example. The liquid dripping portion 58 can be made of another material that does not corrode in a chloride solution and does not deteriorate after being stored for long periods of time.

The liquid dripping portion 58 is formed as a quadrangular pole. The liquid dripping portion 58 is supported in a state where the corners thereof are in contact with an internal surface 60 of the lead-out portion 46, and a flow path 62 through which the internal liquid 42 flows is formed between the outer surface of the liquid dripping portion 58 and the internal surface 60 of the lead-out portion 46.

A first end 64 of the liquid dripping portion 58 is in planar contact with a base end face 66 of the liquid junction portion 54, and a second end 68 of the liquid dripping portion 58 protrudes inside the tank portion 44 of the accommodation portion 40. As a result, the internal liquid 42 in the tank portion 44 is supplied to the liquid junction portion 54 through the liquid dripping portion 58.

The average diameter of the pores in the liquid dripping portion 58 is 10 μm or greater and less than or equal to the maximum size that would allow capillary action of the internal liquid 42. Specifically, the average diameter is 10 μm to 100 μm, inclusive. In the present embodiment, the average diameter of the pores in the liquid dripping portion 58 is 17 μm.

The average diameter of the pores in the liquid junction portion 54 is set to 1 nm to 10 nm, inclusive, and in the present embodiment, the average diameter of the pores in the liquid junction portion 54 is 4 nm.

It is preferable that the average diameter of the pores of the liquid dripping portion 58 be 4000 times or greater the average diameter of the pores of the liquid junction portion 54, and in the present embodiment as well, the average diameter of the pores of the liquid dripping portion 58 is set to 4000 times or greater the average diameter of the pores of the liquid junction portion 54.

Thus, it is possible to quickly supply the internal liquid 42 to the liquid junction portion 54 through the liquid dripping portion 58, the pores of which have a large diameter, and it is possible to suppress the amount of internal liquid 42 seeping from the liquid junction portion 54, thereby enabling long-term use.

The second end face 52 of the tank portion 44 has fixed thereto a control substrate 70, and an internal electrode 72 extends from the control substrate 70. The internal electrode 72 penetrates the second end face 52 of the tank portion 44 and extends therein, and is inserted into the internal liquid 42 in the tank portion 44. The tip of the internal electrode 72 approaches the first end face 50 of the tank portion 44.

The internal electrode 72 is disposed at a position offset from a central axis CJ of the liquid dripping portion 58, and the tip of the internal electrode 72 has a length that reaches further towards the first end 64 than the second end 68 of the liquid dripping portion 58. As a result, at least a portion of the internal electrode 72 is positioned towards the first end 64 than the second end 68 of the liquid dripping portion 58.

Examples of the internal liquid 42 include a potassium chloride (KCl) solution and a sodium chloride (NaCl) solution, for example, and examples of the material constituting the internal electrode 72 include silver and silver chloride (Ag/AgCl).

The control substrate 70 is provided with a connector 74, and the portion of the case 14 facing the connector 74 has formed therein a connector insertion hole 76. As a result, by connecting a communication cable to the connector 74, it is possible to attain a configuration in which detection results from the sensor 12 can be outputted.

The lead-out portion 46 provided on the accommodation portion 40 of the reference electrode 10 has an O-ring 78 fitted therearound, and movement of the O-ring 78 in a direction approaching the first end face 50 is restricted by a stopper 80 provided on the first end face 50 of the accommodation portion 40.

The lead-out portion 46 is inserted into the hole 22 provided in the case 14, such that an end face 82 of the liquid junction portion 54 provided at the tip of the lead-out portion 46 is flush with the bottom surface 20 of the case 14.

In the present embodiment, the liquid junction portion 54 is fixed to the lead-out portion 46 by the thermal contraction tube 56, but the structure is not limited thereto. A stopper that abuts the end face 82 of the liquid junction portion 54 may be provided on the case 14 so as to prevent the liquid dripping portion 58 from separating.

In this insertion state, the O-ring 78 fitted around the lead-out portion 46 is fitted inside the counterbore 28 in the case 14, and the O-ring 78 is in close contact with the internal surface of the counterbore 28 and the external surface of the lead-out portion 46. As a result, watertightness is ensured, and it is possible to mitigate the entry of moisture into the interior.

The sensor 12 includes the reference electrode 10, the ISFET chip 38, and the substrates 34 and 70, which control the foregoing, and measures to prevent water from adhering to the substrates 34 and 70 are necessary. By disposing the O-ring 78 at the base end of the lead-out portion 46, it is possible to separate the inside of the case 14 from the outside thereof with ease, and it is possible to protect the substrates 34 and 70 from the external environment and for the sensor 12 to perform stable measurements over a long period of time.

(Operation/Effect)

Next, the operation of the present embodiment will be explained.

In the reference electrode 10 of the present embodiment, the second end 68 of the liquid dripping portion 58, the first end 64 of which is in contact with the liquid junction portion 54, protrudes into the accommodation portion 40, and thus, it is possible to guide the internal liquid 42 in the accommodation portion 40 through the liquid dripping portion 58 to the liquid junction portion 54.

The internal electrode 72 inserted into the tank portion 44 of the accommodation portion 40 has a length such that the tip protrudes further towards the first end 64 than the second end 68 of the liquid dripping portion 58, and at least a portion of the internal electrode 72 is further towards the first end 64 than the second end 68 of the liquid dripping portion 58.

Thus, in a usage state where the bottom surface 20 faces downward, even if there is a decrease in the amount of the internal liquid 42 and the liquid surface 42A drops below the second end 68 of the liquid dripping portion 58, electrical conduction can be maintained between the internal electrode 72 and the internal liquid 42 seeping out of the liquid junction portion 54, through the internal liquid 42 that has impregnated the liquid junction portion 54.

As a result, even if the liquid surface 42A of the internal liquid 42 has dropped below the second end 68 of the liquid dripping portion 58, it is possible to apply a reference potential to the object for measurement. Therefore, it is possible to mitigate a decrease in functionality resulting from a decrease in the amount of the internal liquid 42. Thus, it is possible to attain stable measurement results over a long period of time.

Also, in the present embodiment, the liquid junction portion 54 is fixed to the tip of the lead-out portion 46 using the thermal contraction tube 56.

Thus, according to the structure for fixing the liquid junction portion 54 in the case 14 by being fitted therein, the manufacturing cost can be reduced as compared to a situation in which the case 14 must be designed with consideration for the manufacturing tolerance of the case 14 and the liquid junction portion 54. Also, it is possible to mitigate a situation in which the liquid junction portion 54 falls out due to differences in the coefficient of thermal expansion between the case 14 and the liquid junction portion 54.

Here, if fixing the lead-out portion 46 to the liquid junction portion 54 using the thermal contraction tube 56 as in the present embodiment in order to reduce cost, there is a need to match the outer diameter of the lead-out portion 46 with the outer diameter GS of the liquid junction portion 54. If, in order to achieve long-term use, the diameter of the liquid junction portion 54 were reduced in order to reduce the amount of seepage of the internal liquid 42, the internal diameter NS of the lead-out portion 46 would be reduced.

In such a case, if air bubbles enter the lead-out portion 46 due to vibration during transit or the orientation during storage, it is difficult for air bubbles to escape from the lead-out portion 46, which has a small diameter, resulting in conduction between the internal liquid 42, which is in contact with the object for measurement, and the internal electrode 72 being cut off, which causes a defect that prevents measurement of pH.

However, in the present embodiment, the liquid dripping portion 58 is inserted into the lead-out portion 46, and it is possible to supply the internal liquid 42 in the accommodation portion 40 through the liquid dripping portion 58 to the liquid junction portion 54. Thus, it is possible to mitigate defects resulting from air bubbles that have formed in the lead-out portion 46.

The liquid dripping portion 58 of the reference electrode 10 is made of polypropylene.

Thus, it is possible to mitigate corrosion or the like of the liquid dripping portion 58 by the chloride solution, which constitutes the internal liquid 42, and to mitigate deterioration due to long-term storage. Also, polypropylene is durable against the alkalinity or acidity of the object for measurement, and thus, it is possible to mitigate degeneration of the liquid dripping portion 58.

Also the internal electrode 72 is disposed at a position offset from a central axis CJ of the liquid dripping portion 58.

Thus, it is possible to mitigate unwanted contact between the liquid dripping portion 58 and the internal electrode 72. As a result, it is possible to mitigate peeling of the AgCl that has been plated onto the internal electrode 72.

The liquid junction portion 54 and the liquid dripping portion 58 are made of porous materials having pores, and the average diameter of the pores of the liquid junction portion 54 less than an average diameter of the pores of the liquid dripping portion 58. For example, in one embodiment, the average diameter of the pores of the liquid junction portion 54 is 1 nm to 10 nm, inclusive. The average diameter of the pores in the liquid dripping portion 58 is 10 μm or greater and less than or equal to the maximum size that would allow capillary action of the internal liquid 42.

Thus, compared to a case in which the average diameter of the pores of the liquid junction portion 54 and the liquid dripping portion 58 were the same, it is possible to increase supply of the internal liquid 42 to the liquid junction portion 54 due to the larger pores of the liquid dripping portion 58 while suppressing seepage of the internal liquid 42 by the liquid junction portion 54, which has smaller pores.

Therefore, compared to a case in which the structure requires regular maintenance, such as a reference electrode made for the purpose of measuring an electrochemical index of boiler water or the like, which is high temperature and pressure, it is possible to use the reference electrode of the present embodiment even without the expert knowledge required for maintenance.

Embodiment 2

Figure 2:
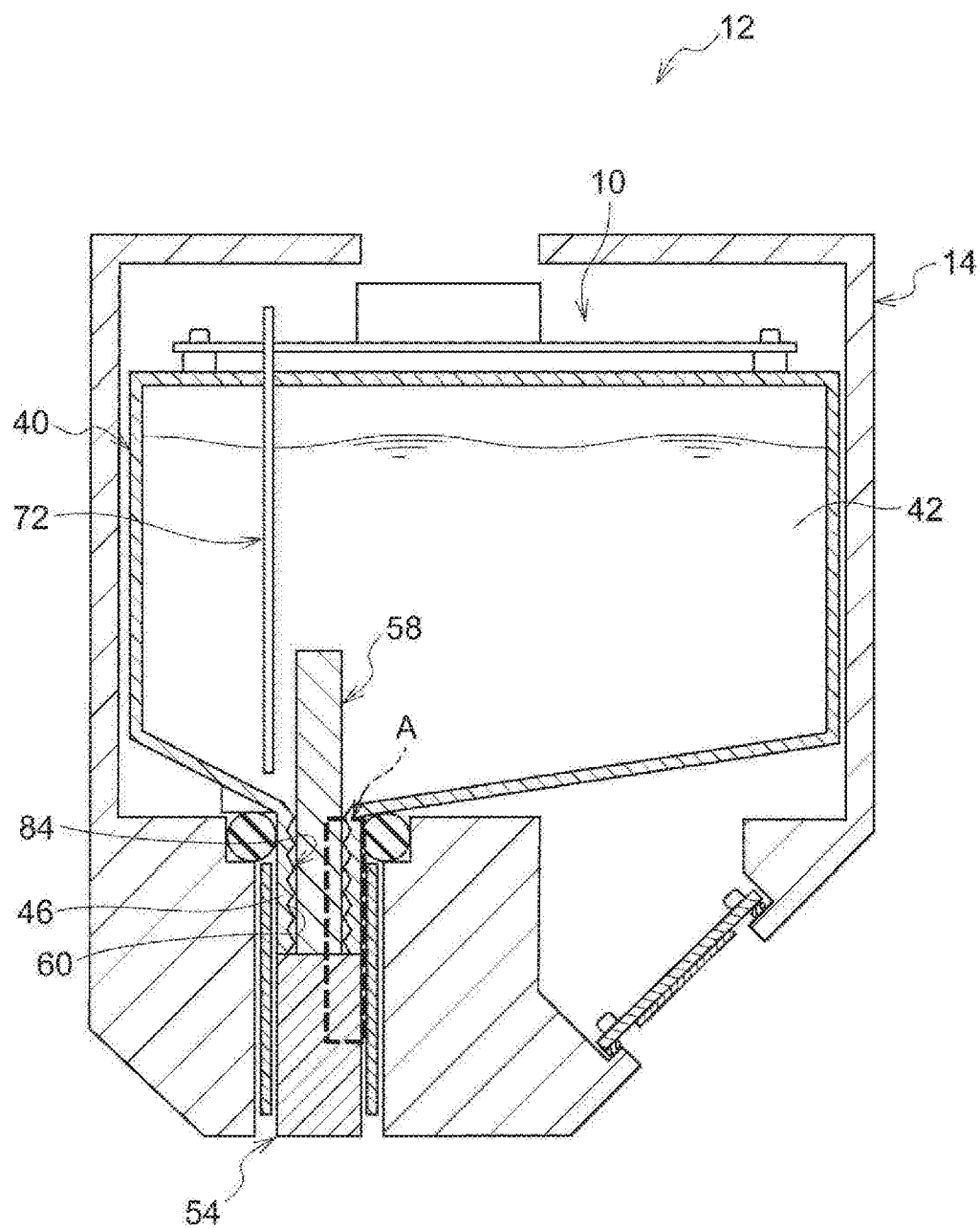
FIG. 2 is a cross-sectional view showing a sensor including a reference electrode according to Embodiment 2.
Figure 3:
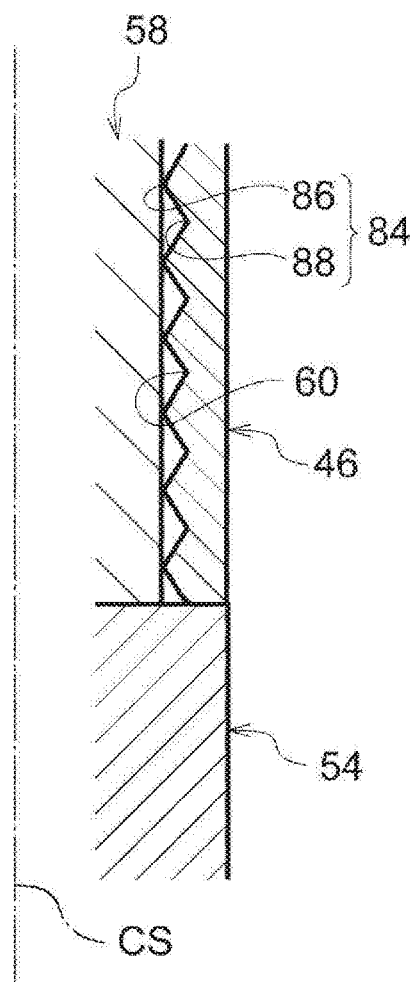
FIG. 3 is an enlarged view of the portion A of FIG. 2.

FIGS. 2 and 3 are cross-sectional views showing a sensor 12 including a reference electrode 10 according to Embodiment 2. Portions that are the same as or equivalent to Embodiment 1 are assigned the same reference characters and descriptions thereof are omitted. Only differing portions will be described.

The reference electrode 10 according to the present embodiment differs in terms of the lead-out portion 46 as compared to Embodiment 1.

Specifically, as shown in FIG. 3, the lead-out portion 46 has a jagged portion 84 formed on the internal surface 60 facing the liquid dripping portion 58, which has been inserted therein. The jagged portion 84 has protrusions 86 that protrude in a mountain, saw-tooth, or triangular form towards the center CS of the lead-out portion 46, and recesses 88 that are recessed towards the outside of the lead-out portion 46, and the protrusions 86 and the recesses 88 are formed alternately in the length direction of the lead-out portion 46.

Protrusions 86 that are adjacent to each other in the length direction of the lead-out portion 46 may be formed independently, or may be formed as a screw thread formed in a spiral along the internal surface 60.

By forming the protrusions 86 of the liquid junction portion 54 as a screw thread, it is possible to insert the lead-out portion 46 while rotating the liquid dripping portion 58, thereby enabling easy insertion.

(Operation/Effect)

Even with this configuration, similar operations and effects to Embodiment 1 can be attained.

Also, in the present embodiment, it is possible to increase frictional resistance between the protrusions 86 formed on the lead-out portion 46 and the liquid junction portion 54, thereby enabling mitigation of unwanted detachment of the liquid junction portion 54 from the lead-out portion 46.

Embodiment 3

Figure 4:
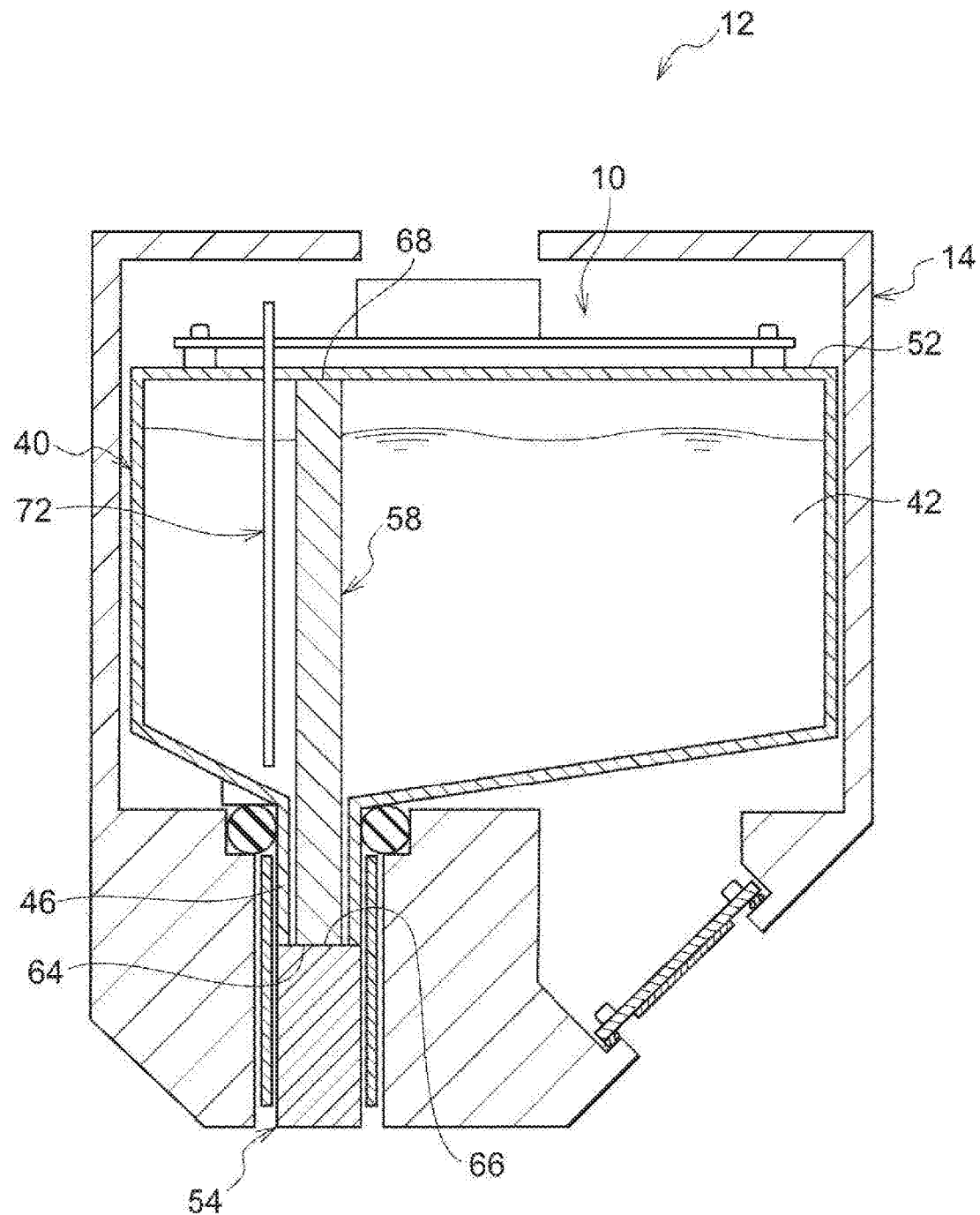
FIG. 4 is a cross-sectional view showing a sensor including a reference electrode according to Embodiment 3.

FIG. 4 is a cross-sectional view showing a sensor 12 including a reference electrode 10 according to Embodiment 3. Portions that are the same as or equivalent to Embodiment 1 are assigned the same reference characters and descriptions thereof are omitted. Only differing portions will be described.

The reference electrode 10 according to the present embodiment differs in terms of the liquid dripping portion 58 as compared to Embodiment 1.

Specifically, the second end 68 of the liquid dripping portion 58 is long enough to come into contact with the second end face 52, which is an example of a wall surface of the accommodation portion 40.

(Operation/Effect)

Even with this configuration, similar operations and effects to Embodiment 1 can be attained.

Also, in the present embodiment, a first end 64 of the liquid dripping portion 58 is in contact with a base end face 66 of the liquid junction portion 54, and the second end 68 is in contact with the second end face 52 of the accommodation portion 40. As a result, the liquid dripping portion 58 has one end surrounded by the lead-out portion 46, and is held in a state of being sandwiched on both ends by the base end face 66 of the liquid junction portion 54 and the second end face 52 of the accommodation portion 40.

Thus, it is possible to mitigate a situation in which the liquid junction portion 54 falls out.

Embodiment 4

Figure 5:
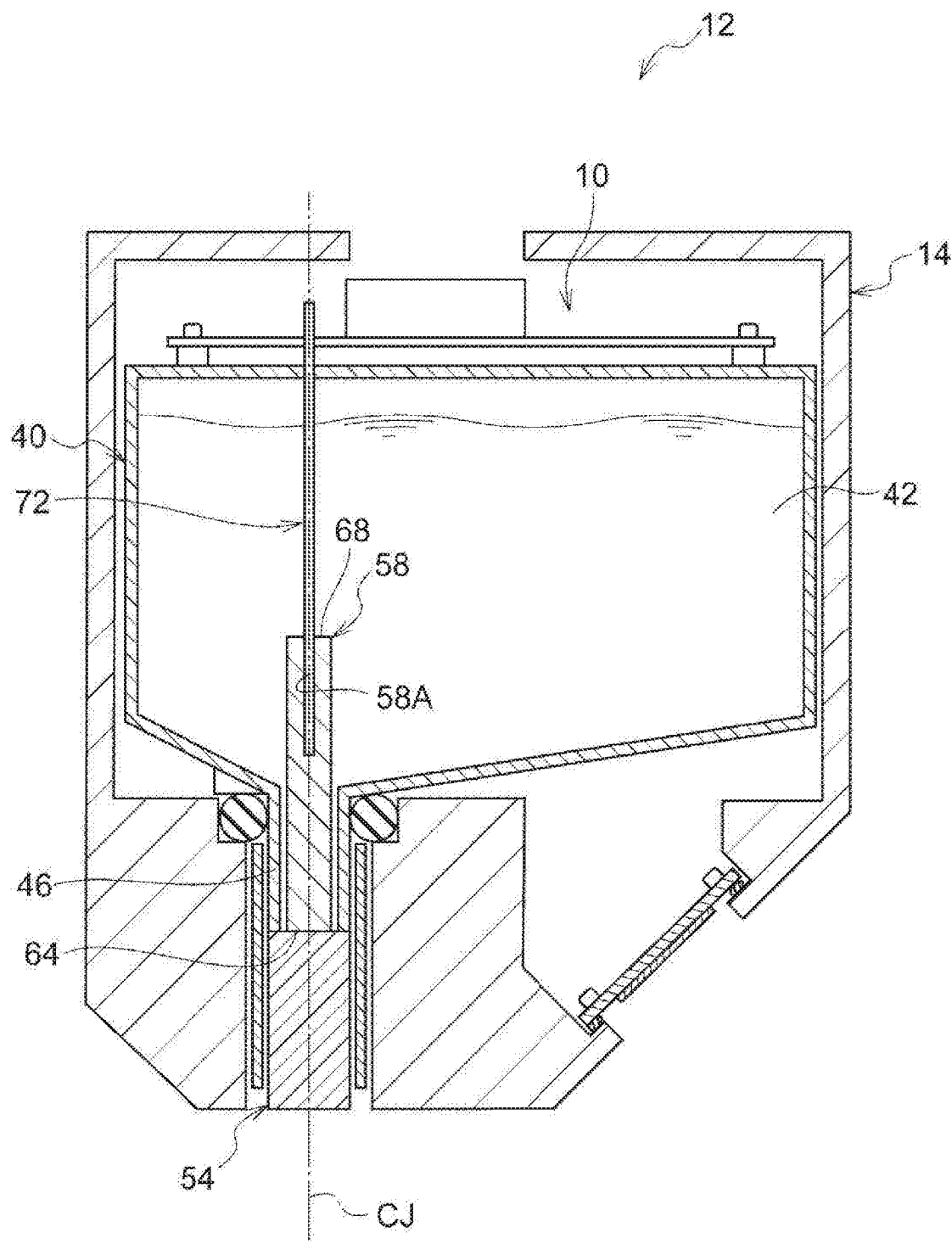
FIG. 5 is a cross-sectional view showing a sensor including a reference electrode according to Embodiment 4.

FIG. 5 is a cross-sectional view showing a sensor 12 including a reference electrode 10 according to Embodiment 4. Portions that are the same as or equivalent to Embodiment 1 are assigned the same reference characters and descriptions thereof are omitted. Only differing portions will be described.

The reference electrode 10 according to the present embodiment differs in terms of the positional relationship between the internal electrode 72 and the liquid dripping portion 58 as compared to Embodiment 1.

Specifically, an insertion hole 58A formed along a center axis CJ is formed on a second end side of the liquid dripping portion 58, and this insertion hole 58A is formed in the second end 68. Also, the internal electrode 72 is disposed on the central axis CJ of the liquid dripping portion 58, and the tip of the internal electrode 72 is inserted into the insertion hole 58A of the liquid dripping portion 58.

As a result, at least a portion of the internal electrode 72 is inserted in the liquid dripping portion 58.

In the present embodiment, in assembling the reference electrode 10, the liquid dripping portion 58 has the internal electrode 72 inserted in advance into the insertion hole 58A.

(Operation/Effect)

Even with this configuration, similar operations and effects to Embodiment 1 can be attained.

Also, in the present embodiment, a portion of the internal electrode 72 is inserted into the liquid dripping portion 58, and thus, the internal electrode 72 can perform charge exchange with the internal liquid 42 that has impregnated the liquid dripping portion 58. Thus, while the liquid dripping portion 58 is impregnated with the internal liquid 42, it is possible to apply a reference potential, and thus, it is possible to lengthen the time over which the reference electrode 10 can be used.

Also, it is possible to attain effects resulting from the internal electrode 72 being closer to the liquid junction portion 54.

Embodiment 5

Figure 6:
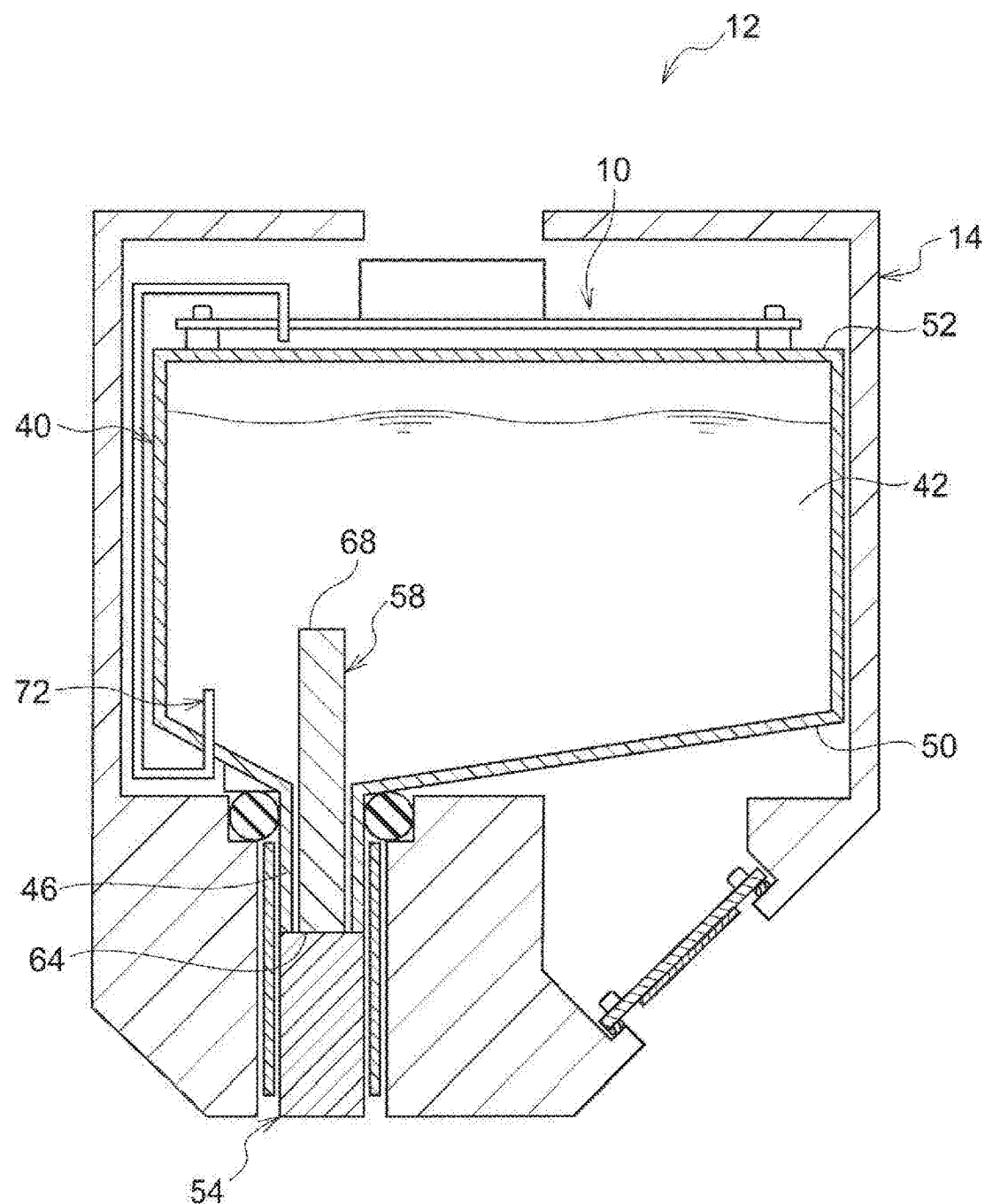
FIG. 6 is a cross-sectional view showing a sensor including a reference electrode according to Embodiment 5.

FIG. 6 is a cross-sectional view showing a sensor 12 including a reference electrode 10 according to Embodiment 5. Portions that are the same as or equivalent to Embodiment 1 are assigned the same reference characters and descriptions thereof are omitted. Only differing portions will be described.

The reference electrode 10 according to the present embodiment differs in terms of the arrangement of the internal electrode 72 as compared to Embodiment 1.

Specifically, the internal electrode 72 extends into the accommodation portion 40 from the first end face 50 of the accommodation portion 40 in which the lead-out portion 46 is provided. As a result, the internal electrode 72 protrudes inward towards the accommodation portion 40 from the first end face 50, which is the wall surface of the accommodation portion 40 on the liquid junction portion 54 side.

(Operation/Effect)

Even with this configuration, similar operations and effects to Embodiment 1 can be attained.

Also, in the present embodiment, the internal electrode 72 protrudes from the first end face 50 on the liquid junction portion 54 side of the accommodation portion 40. Thus, compared to a case in which the internal electrode 72 extends from the second end face 52, which is opposite to the side with the liquid junction portion 54, towards the liquid junction portion 54, it is possible to shorten the separation distance between the position where the internal electrode 72 is fixed and the liquid dripping portion 58.

In a usage state where the bottom surface 20 faces downward, even if there is a decrease in the amount of the internal liquid 42 and the liquid surface 42A drops below the second end 68 of the liquid dripping portion 58, electrical conduction can be maintained to a greater degree between the internal electrode 72 and the internal liquid 42 seeping out of the liquid junction portion 54, compared to a case in which the internal electrode 72 extends into the tank portion 44 from the peripheral surface 48 of the tank portion 44 or the second end face 52.

As a result, it is possible to stably maintain the position of the internal electrode 72 relative to the liquid dripping portion 58. Also, it is possible to mitigate interference between the internal electrode 72 and the liquid junction portion 54 resulting from assembly, and it is possible to mitigate unexpected peeling of the AgCl that has been plated onto the internal electrode 72.

Embodiment 6

Figure 7:
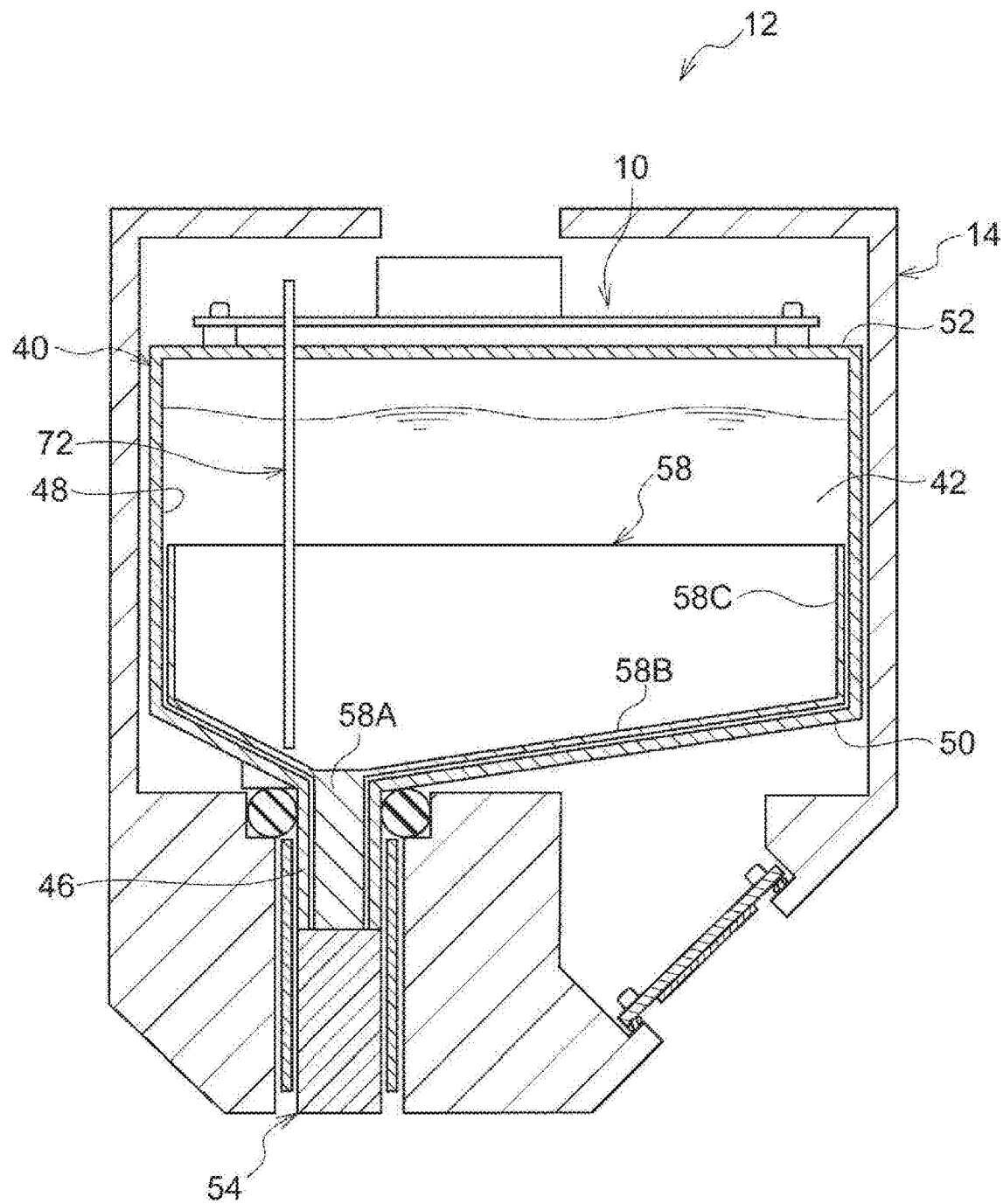
FIG. 7 is a cross-sectional view showing a sensor including a reference electrode according to Embodiment 6.
Figure 8:
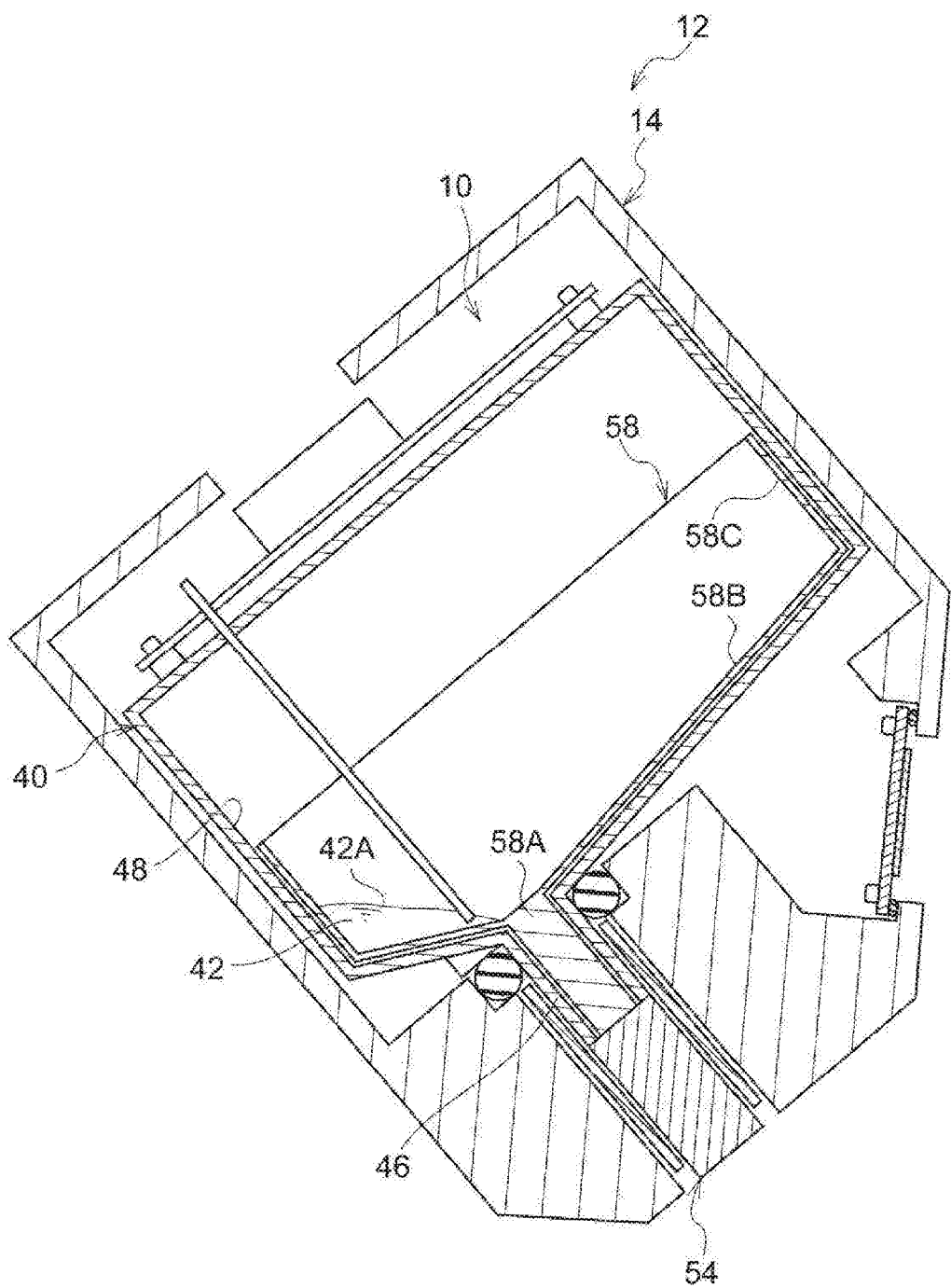
FIG. 8 is a descriptive view showing a state in which the sensor according to Embodiment 6 is used in an inclined state.

FIGS. 7 and 8 are cross-sectional views showing a sensor 12 including a reference electrode 10 according to Embodiment 6. Portions that are the same as or equivalent to Embodiment 1 are assigned the same reference characters and descriptions thereof are omitted. Only differing portions will be described.

The reference electrode 10 according to the present embodiment differs in terms of the shape of the liquid dripping portion 58 as compared to Embodiment 1.

Specifically, the liquid dripping portion 58 includes an insertion hole 58A that is inserted into the lead-out portion 46, and a bottom surface 58B that extends from the insertion hole 58A and that is arranged so as to be stacked on the first end face 50 of the accommodation portion 40. Also, the liquid dripping portion 58 includes a cylindrical side wall 58C that rises from the ends of the bottom surface 58B and extends along the peripheral surface 48 of the accommodation portion 40, and the insertion hole 58A, the bottom surface 58B, and the side wall 58C are formed integrally.

As a result, at least a portion of the liquid dripping portion 58 extends along the peripheral surface 48, which is an example of an internal wall of the accommodation portion 40.

(Operation/Effect)

Even with this configuration, similar operations and effects to Embodiment 1 can be attained.

Also, in the present embodiment, the liquid dripping portion 58 is formed along the peripheral surface 48 of the accommodation portion 40. Thus, as shown in FIG. 8, when the sensor 12 is used in an inclined state, even if the liquid surface 42A of the internal liquid 42 does not reach the opening of the lead-out portion 46, it is possible to supply the internal liquid 42 through the liquid dripping portion 58 to the liquid junction portion 54.

Therefore, even when using the sensor 12 in an inclined state with a reduced amount of the internal liquid 42, it is possible to apply the reference potential, enabling long-term use.

Embodiment 7

Figure 9:
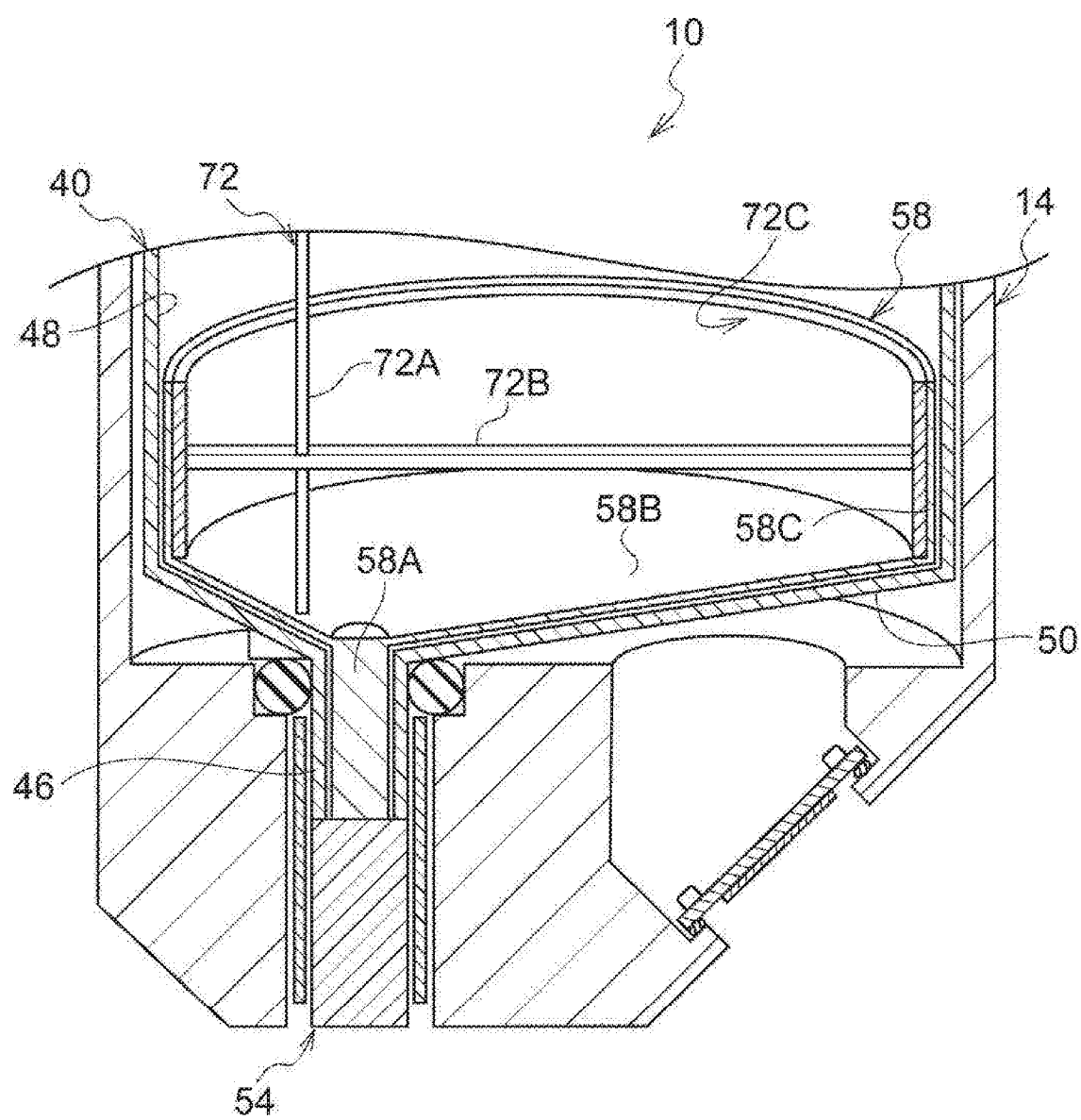
FIG. 9 is a perspective cross-sectional view showing a sensor including a reference electrode according to Embodiment 7.
Figure 10:
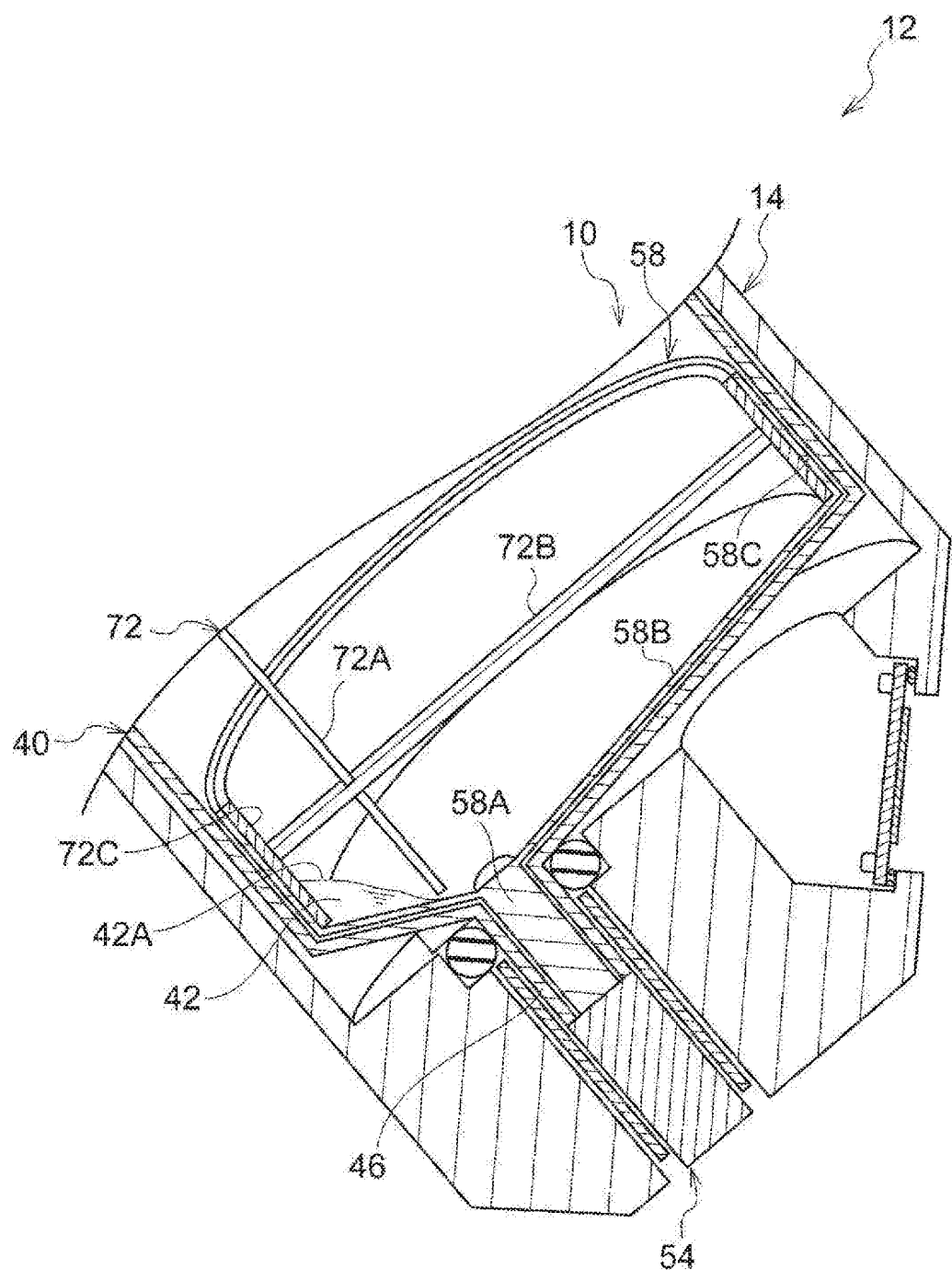
FIG. 10 is a descriptive view showing a state in which the sensor according to Embodiment 7 is used in an inclined state.

FIGS. 9 and 10 are cross-sectional, perspective views showing a sensor 12 including a reference electrode 10 according to Embodiment 7. Portions that are the same as or equivalent to Embodiment 6 are assigned the same reference characters and descriptions thereof are omitted. Only differing portions will be described.

The reference electrode 10 according to the present embodiment differs in terms of the structure of the internal electrode 72 as compared to Embodiment 6.

Specifically, the internal electrode 72 includes a core 72A that penetrates the second end face 52 (not shown in FIGS. 9 and 10, due to the perspective view) of the accommodation portion 40 (see FIG. 7) and extends linearly, an extension portion 72B that extends towards the side from the core 72A, and a cylindrical portion 72C having a cylindrical shape that is connected to the extension portion 72B and that extends in contact with the side wall 58C of the liquid dripping portion 58.

As a result, the internal electrode 72 is in contact with the liquid dripping portion 58.

(Operation/Effect)

Even with this configuration, similar operations and effects to Embodiments 1 and 6 can be attained.

Also, the internal electrode 72 of the present embodiment includes a cylindrical portion 72C that extends along the side wall 58C of the liquid dripping portion 58 and that is in contact with the side wall 58C.

Thus, as shown in FIG. 10, when the sensor 12 is used in an inclined state, even if the liquid surface 42A of the internal liquid 42 does not reach the opening of the lead-out portion 46, it is possible to supply the internal liquid 42 through the liquid dripping portion 58 to the liquid junction portion 54.

Even if the liquid surface 42A of the internal liquid 42 does not reach the core 72A of the internal electrode 72, the internal liquid 42 is in contact with the cylindrical portion 72C of the internal electrode 72, and thus, it is possible for the internal electrode 72 to exchange charge with the internal liquid 42.

Thus, compared to Embodiment 6, even when using the sensor 12 in an inclined state with an even more reduced amount of the internal liquid 42, it is possible to apply the reference potential, enabling long-term use.

In the present embodiment, by having a structure in which the cylindrical portion 72C of the internal electrode 72 is in contact with the liquid dripping portion 58, it is possible to ensure conduction between the internal electrode 72 and the internal liquid 42 that has impregnated the liquid junction portion 54, thereby enabling a more preferable form.

Embodiment 8

Figure 11:
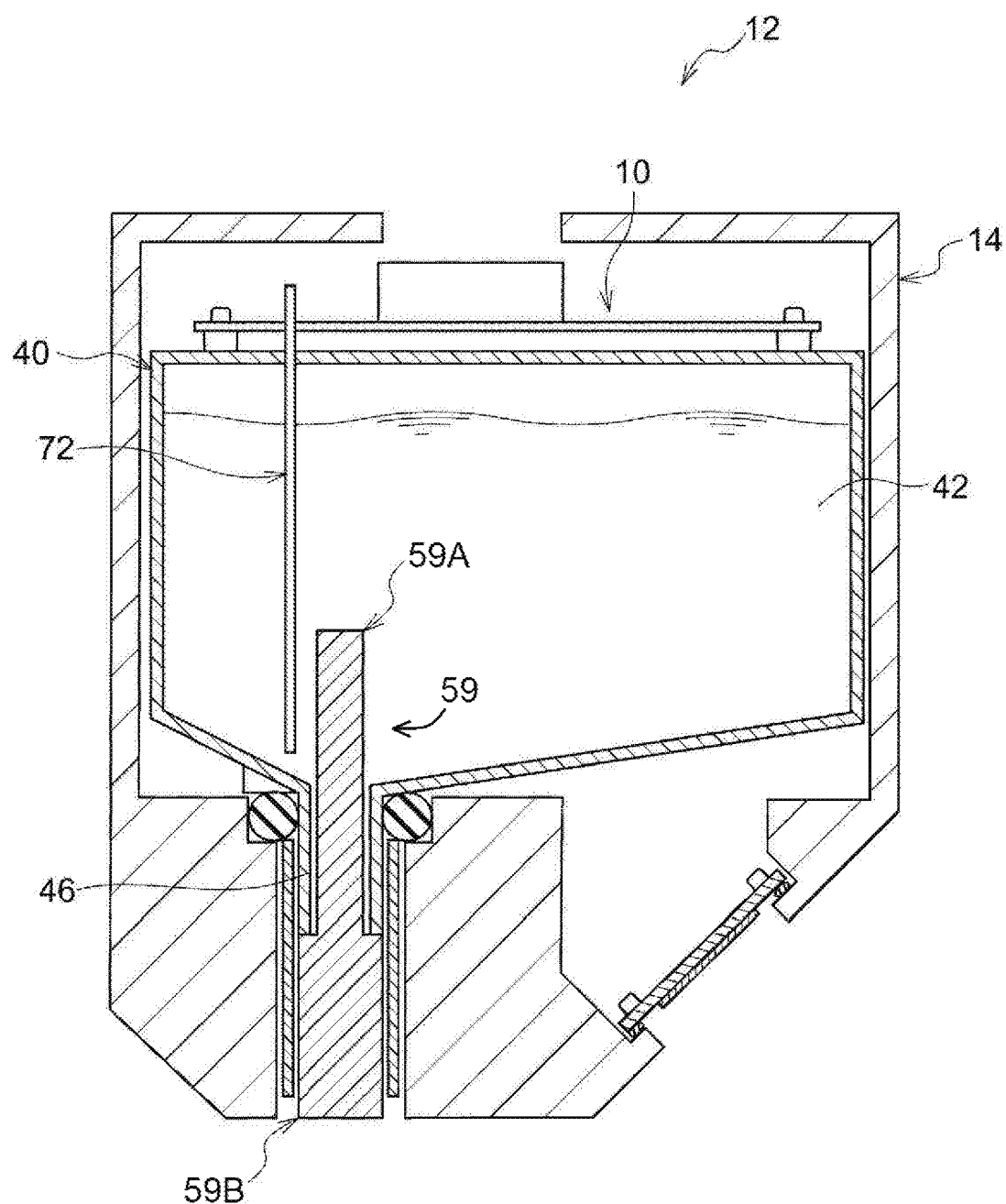
FIG. 11 is a cross-sectional view showing a sensor including a reference electrode according to Embodiment 8.

FIG. 11 is a cross-sectional view showing a sensor 12 including a reference electrode 10 according to Embodiment 8. Portions that are the same as or equivalent to Embodiment 1 are assigned the same reference characters and descriptions thereof are omitted. Only differing portions will be described.

The reference electrode 10 according to the present embodiment differs in terms of the structure of the integrated liquid dripping portion 59 compared to the separate liquid dripping portion 58 and liquid junction portion 54 in Embodiment 1.

Specifically, the integrated liquid dripping portion 59 includes a liquid dripping region 59A and a liquid junction region 59B, which has a larger diameter than the liquid dripping portion 59A, are formed integrally of the same material, and an example of such a material is polypropylene. In the present embodiment, the viscosity of the internal liquid 42 is adjusted according to the average diameter of the pores of the integrated liquid dripping portion 59.

Thus, the liquid dripping region 59A and the liquid junction portion 59B are formed integrally in an integrated liquid dripping portion 59.

(Operation/Effect)

Even with this configuration, similar operations and effects to Embodiments 1 and 6 can be attained. For example, in one embodiment, the liquid dripping region 59A has an average pore diameter greater than the liquid junction portion 59B.

Also, in the present embodiment, the integrated liquid dripping portion 59 makes it possible to prevent defects such as an offset in cores between the liquid dripping portion 59A and the liquid junction portion 59B.

Thus, it is possible to reduce the cost of material acquisition as well as to reduce the number of assembly steps.

Therefore, it is possible to reduce the cost of the sensor 12.

DESCRIPTION OF REFERENCE CHARACTERS

- 10 reference electrode
- 40 accommodation portion
- 42 internal liquid
- 42A liquid surface
- 46 lead-out portion
- 54 liquid junction portion
- 58 liquid dripping portion
- 58C side wall
- 59 integrated liquid dripping portion
- 59A liquid dripping portion
- 59B liquid junction portion
- 60 internal surface
- 64 first end
- 68 second end
- 72 internal electrode
- 72C cylindrical portion
- 84 jagged portion
- 86 protrusion

What is claimed is:

1. A reference electrode, comprising:
    an accommodation portion that is provided with a tube-shaped lead-out portion, and that can accommodate an internal liquid;
    a liquid junction portion that is connected to an end of the lead-out portion;
    a liquid dripping portion that has a first portion with a first end on a first end side of the liquid dripping portion, the first portion extending into the lead-out portion and the first end being connected to a base end face of the liquid junction portion inside the lead-out portion, and that has a second portion with a second end on a second end side of the liquid dripping portion, the second portion extending outside the lead-out portion into the accommodation portion; and
    an internal electrode having at least a portion that is positioned further toward the first end side than toward the second end side of the liquid dripping portion;
    wherein an outer diameter of the liquid junction portion is substantially the same as an outer diameter of the lead-out portion.

2. The reference electrode according to claim 1, wherein the lead-out portion has a jagged portion formed on a surface facing the liquid dripping portion that has been inserted into the lead-out portion.

3. The reference electrode according to claim 1, wherein the liquid dripping portion is made of polypropylene.

4. The reference electrode according to claim 1, wherein the second end of the liquid dripping portion is in contact with a wall surface of the accommodation portion.

5. The reference electrode according to claim 1, wherein at least a portion of the liquid dripping portion extends along an inner wall of the accommodation portion.

6. The reference electrode according to claim 5, wherein the internal electrode is in contact with the liquid dripping portion.

7. The reference electrode according to claim 6, wherein the internal electrode is disposed at a position offset from a central axis that passes through the first end and the second end of the liquid dripping portion.

8. The reference electrode according to claim 1, wherein the internal electrode protrudes inward towards the accommodation portion from a wall surface of the accommodation portion on a liquid junction portion side.

9. The reference electrode according to claim 1, wherein at least a portion of the internal electrode is inserted in the liquid dripping portion.

10. The reference electrode according to claim 1, wherein the liquid junction portion and the liquid dripping portion are made of a porous material having pores.

11. The reference electrode according to claim 10, wherein an average diameter of the pores in the liquid junction portion is 1 nm to 10 nm, inclusive, and an average diameter of the pores in the liquid dripping portion is 10 µm to 100 µm, inclusive.

12. The reference electrode according to claim 1, wherein an extent of the second portion of the liquid dripping portion extends in parallel with an extent of the at least the portion of the internal electrode inside the accommodation portion.

13. The reference electrode according to claim 1, wherein the accommodation portion has formed therein a tank portion, and an end face of the tank portion slopes toward the lead-out portion.

14. The reference electrode according to claim 1, wherein in a cross-sectional view the liquid dripping portion extends in a first direction into the accommodation portion, and has a length in the first direction and a width in a second direction orthogonal to the first direction, and wherein the length is greater than the width.

15. The reference electrode according to claim 1, wherein in a cross-sectional view the second portion of the liquid dripping portion has a uniform width and is separated by spaces wider than the uniform width from side walls of the accommodation portion, and the liquid dripping portion and the liquid junction portion have a common central axis.

* * * * *